(12) United States Patent
Wang et al.

(10) Patent No.: US 9,881,090 B2
(45) Date of Patent: Jan. 30, 2018

(54) METHOD AND APPARATUS FOR PROVIDING INFORMATION AND METHOD AND APPARATUS FOR PROVIDING SEARCH RESULT

(71) Applicant: Baidu Online Network Technology (Beijing) Co., Ltd, Beijing (CN)

(72) Inventors: Daolong Wang, Beijing (CN); Jun Li, Beijing (CN); Xiaowei Liu, Beijing (CN); Huaming Li, Beijing (CN); Yufei Yan, Beijing (CN); Meng Liu, Beijing (CN); Yi Yuan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 493 days.

(21) Appl. No.: 14/586,436

(22) Filed: Dec. 30, 2014

(65) Prior Publication Data

US 2015/0310106 A1 Oct. 29, 2015

(30) Foreign Application Priority Data

Apr. 29, 2014 (CN) .......................... 2014 1 0178046

(51) Int. Cl.
*G06F 7/00* (2006.01)
*G06F 17/30* (2006.01)

(52) U.S. Cl.
CPC .. *G06F 17/30864* (2013.01); *G06F 17/30554* (2013.01); *G06F 17/30616* (2013.01); *G06F 17/30867* (2013.01)

(58) Field of Classification Search
CPC ......... G06F 17/30864; G06F 17/30867; G06F 17/30991; G06F 17/30616; G06F 17/30554
(Continued)

(56) References Cited

U.S. PATENT DOCUMENTS

| 2007/0150342 | A1* | 6/2007 | Law | ....................... G06Q 30/02 705/14.52 |
| 2007/0150346 | A1* | 6/2007 | Sobotka | ................. G06Q 30/02 705/14.53 |

(Continued)

*Primary Examiner* — Kris Mackes
*Assistant Examiner* — Lin Lin Htay
(74) *Attorney, Agent, or Firm* — Orrick, Herrington & Sutcliffe LLP

(57) ABSTRACT

The present invention provides a method and apparatus for providing information and a method and apparatus for providing a search result. The method for providing information comprises: acquiring a current hotspot event, and determining a first keyword corresponding to the current hotspot event; determining a second keyword matched with the first keyword in a pre-built first database, and determining an information provider suitable for hotspot correlation according to the second keyword, the first database comprising the information provider and the second keyword corresponding to the information provider; and generating hotspot information materials of the information provider suitable for hotspot correlation according to the first keyword, and making the hotspot information materials online so as to be provided for a user. The method for providing information in the embodiments of the present invention can meet user needs, can increase the information provision efficiency, and improve the information conversion rate.

20 Claims, 6 Drawing Sheets

(58) Field of Classification Search
USPC .......................................................... 707/722
See application file for complete search history.

(56) References Cited

U.S. PATENT DOCUMENTS

2013/0212192 A1* 8/2013 Yerli ........................ H04L 51/32
                                                           709/206
2013/0297581 A1* 11/2013 Ghosh ............... G06F 17/30864
                                                           707/706
2015/0254021 A1* 9/2015 Hu .......................... H04L 51/22
                                                           710/55

* cited by examiner

METHOD AND APPARATUS FOR PROVIDING INFORMATION AND METHOD AND APPARATUS FOR PROVIDING SEARCH RESULT

CROSS-REFERENCE TO RELATED APPLICATIONS

The present application claims priority to Chinese Patent Application No. CN201410178046.2, filed on Apr. 29, 2014, the entire disclosure of which is incorporated herein by reference in its entirety and for all purposes.

TECHNICAL FIELD

The present invention relates to the technical field of the Internet, and in particular to a method and apparatus for providing information and a method and apparatus for providing a search result.

BACKGROUND

With the development of Internet technologies and mobile Internet technologies, more and more information providers provide information by means of the Internet and mobile Internet. Information provided by means of the Internet and mobile Internet has the advantages of a wide coverage area, strong activeness and initiative, relatively low costs, a high cost-performance ratio, and strong interaction.

At present, Internet/mobile Internet information provision technologies mostly use a method of keyword matching to directly make information obtained by matching in an information database online on a web page. However, the problems existing in the related art are low efficiency in information provision and an inability to meet user needs, etc. due to the fact that most information in the information database is edited by information providers, thereby having no timeliness and not being targeted.

SUMMARY

The present invention is intended to solve one of the technical problems in the related art at least to some extent.

For this purpose, a first objective of the present invention is to propose a method for providing information. The method can meet user needs, can increase the information provision efficiency, and improve the information conversion rate.

A second objective of the present invention is to propose an apparatus for providing information.

A third objective of the present invention is to propose a method for providing a search result.

A fourth objective of the present invention is to propose an apparatus for providing a search result.

In order to achieve the above-mentioned objectives, a method for providing information of a first aspect embodiment of the present invention comprises: acquiring a current hotspot event, and determining a first keyword corresponding to the current hotspot event; determining a second keyword matched with the first keyword in a pre-built first database, and determining an information provider suitable for hotspot correlation according to the second keyword, the first database comprising the information provider and the second keyword corresponding to the information provider; and generating hotspot information materials of the information provider suitable for hotspot correlation according to the first keyword, and making the hotspot information materials online so as to be provided for a user.

The method for providing information of the embodiments of the present invention can generate hotspot information materials according to a current hotspot event, and organically combine the current hotspot event with information provision appeals of an information provider, so that the online hotspot information materials can precisely reflect the current hotspot event, and as a result, hotspot information materials fitting in with the current hotspot event can be provided when a user is searching. On the one hand, user needs can be met, and on the other hand, the information provision efficiency can be increased and the information conversion rate is improved.

In order to achieve the above-mentioned objectives, an apparatus for providing information of a second aspect embodiment of the present invention comprises: a first acquisition module, for acquiring a current hotspot event; a first determination module, for determining a first keyword corresponding to the current hotspot event; a second determination module, for determining a second keyword matched with the first keyword in a pre-built first database, and determining an information provider suitable for hotspot correlation according to the second keyword, the first database comprising the information provider and the second keyword corresponding to the information provider; a generation module, for generating hotspot information materials of the information provider suitable for hotspot correlation according to the first keyword; and an online module, for making the hotspot information materials online so as to be provided for a user.

The apparatus for providing information of the embodiments of the present invention can generate hotspot information materials according to a current hotspot event, and organically combine the current hotspot event with information provision appeals of an information provider, so that the online hotspot information materials can precisely reflect the current hotspot event, and as a result, hotspot information materials fitting in with the current hotspot event can be provided when a user is searching. On the one hand, user needs can be met, and on the other hand, the information provision efficiency can be increased and the information conversion rate is improved.

In order to achieve the above-mentioned objectives, a method for providing a search result of a third aspect embodiment of the present invention comprises: receiving a search term input by a user; determining whether the search term is correlated with a current hotspot event; acquiring hotspot information materials of the current hotspot event when it is determined that the search term is correlated with the current hotspot event, the hotspot information materials being provided by the method according to the first aspect embodiment of the present invention; and displaying search results to the user, the search results comprising the hotspot information materials of the current hotspot event.

In the method for providing a search result of the embodiments of the present invention, when a user performs a search, if a search term input by the user is correlated with a current hotspot event, search results may be provided for and displayed to the user, the search results comprising hotspot information materials of the current hotspot event, such that, on the one hand, user needs can be met, and on the other hand, the information provision efficiency can be increased and the information conversion rate improved.

In order to achieve the above-mentioned objectives, an apparatus for providing a search result of a fourth aspect embodiment of the present invention comprises: a receiving module, for receiving a search term input by a user; a determination module, for determining whether the search term is correlated with a current hotspot event; an acquisition module, for acquiring hotspot information materials of the current hotspot event when it is determined that the search term is correlated with the current hotspot event, the hotspot information materials being provided by the method according to the first aspect embodiment of the present invention; and a display module, for displaying search results to the user, the search results comprising the hotspot information materials of the current hotspot event.

With the apparatus for providing a search result of the embodiments of the present invention, when a user performs a search, if a search term input by the user is correlated with a current hotspot event, search results may be provided for and displayed to the user, the search results comprising hotspot information materials of the current hotspot event, such that, on the one hand, user needs can be met, and on the other hand, the information provision efficiency can be increased and the information conversion rate improved.

The additional aspects and advantages of the present invention will be provided in part in the description below, and will be apparent in part from the description below, or be understood by means of practice of the present invention.

BRIEF DESCRIPTION OF THE ACCOMPANYING DRAWINGS

The above-mentioned and/or additional aspects and advantages of the present invention will become apparent and easily understood from the description of the embodiments below in conjunction with the accompanying drawings, in which.

DETAILED DESCRIPTION OF THE PREFERRED EMBODIMENTS

Figure 1:
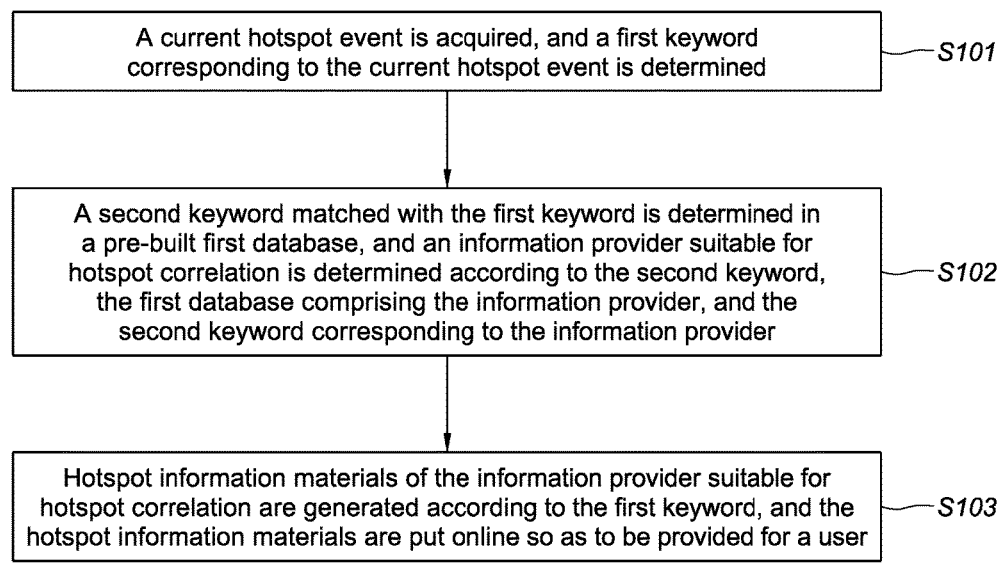
FIG. 1 is a flowchart of a method for providing information according to one embodiment of the present invention.

The embodiments of the present invention will be described in detail below, and examples of the embodiments are shown in the accompanying drawings, in which the same or similar reference numerals represent the same or similar elements or elements having the same or similar functions throughout. The embodiments described below by referring to the accompanying drawings are exemplary and are merely used to explain the present invention, rather than being understood as limitations to the present invention. On the contrary, the embodiments of the present invention include all the changes, modifications and equivalents falling into the scope of the spirit and principles of the appended claims.

In the description of the present invention, it should be understood that the terms "first" and "second" are merely for descriptive purposes, rather than being understood to indicate or imply relative importance. In the description of the present invention, it should be noted that unless explicitly stipulated and defined otherwise, the terms "connected", "connection", etc. should be understood broadly, for example, it may be a fixed connection, may also be a detachable connection, or may be integrated as one; it may be a mechanical connection, and may also be an electrical connection; and it may be a direct connection, or may be an indirect connection by means of an intermediate medium. For those of ordinary skill in the art, the specific meaning of the terms above in the present invention may be understood according to specific situations. Furthermore, in the description of the present invention, unless otherwise specified, the meaning of "multiple" is two or more than two.

Any process or method description in the flowchart or otherwise described herein may be understood to represent a module, segment or section comprising one or multiple codes of executable instructions used for implementing a particular logical function or process step, and the scope of the preferred embodiments of the present invention comprises further implementations, where functions may be carried out not according to the order shown or discussed, comprising according to a basically synchronous manner or an inverse order in accordance with involved functions, and this should be understood by those skilled in the art to which the embodiments of the present invention belong.

At present, most information is edited autonomously by information providers, thereby having no timeliness and not being targeted. If a current hotspot event is combined with information, the information provision efficiency can be increased, and user search needs can also be met. The current hotspot event, speaking in an easily understandable way, refers to an event of great concern to a lot of people in a short time, such as Michael Jackson's death, Li Na wining the Australian Open Tennis Championship, Dad, Where Are We Going, Valentine's Day, National Day, Spring Festival Gala, a sudden earthquake, Snowdon; these events can attract a lot of attention in a very short period of time. By means of utilizing these current hotspot events in combination with information release demands of information providers, the information provision efficiency can be increased, thereby being able to better meet user search needs. For example, the last show of Dad, Where Are We Going was shot in the Snow country of Mudanjiang city, resulting in a sudden increase in attention about the Snow country of Mudanjiang city, and thus relevant information about Mudanjiang city, such as special local products, and air tickets may be automatically generated into online hotspot information materials and put online according to the requirements of the information provider, such that a user may see richer and more accurate information when searching.

For this purpose, the embodiments of the present invention provide a method and apparatus for providing information and a method and apparatus for providing a search result. The method and apparatus for providing information and the method and apparatus for providing a search result in the embodiments of the present invention are described below with reference to the accompanying drawings.

FIG. 1 is a flowchart of a method for providing information according to one embodiment of the present invention.

As shown in FIG. 1, the method for providing information comprises:

S101, a current hotspot event is acquired, and a first keyword corresponding to the current hotspot event is determined.

Specifically, first of all, a current hotspot event is acquired. In the embodiments of the present invention, the current hotspot event may be acquired by various means such as a search term input by a user during a search, popular microblogs, and news headlines, and the means for acquiring the current hotspot event is not limited in the embodiments of the present invention. Then, a first keyword corresponding to the current hotspot event is determined, the first keyword being able to accurately reflect the features of the current hotspot event. Word splitting may be performed on search terms, popular microblogs, news headlines, etc. so as to extract a word with a relatively high frequency as the first keyword. It may also be extracted manually and may likewise be acquired by other methods as well. The methods for acquiring the first keyword are not limited in the embodiments of the present invention.

S102, a second keyword matched with the first keyword is determined in a pre-built first database, and an information provider suitable for hotspot correlation is determined according to the second keyword, the first database comprising the information provider and the second keyword corresponding to the information provider.

The second keyword can accurately reflect the features of the information provided by the information provider, and the second keyword may be autonomously edited by the information provider, and may also be automatically extracted according to the information, and this is not limited in the embodiments of the present invention. Specifically, the first keyword is matched with the second keyword in the first database. If a second keyword which matches successfully exists in the first database, the information provider corresponding to the second keyword which matches successfully is acquired to serve as an information provider suitable for hotspot correlation.

S103, hotspot information materials of the information provider suitable for hotspot correlation are generated according to the first keyword, and the hotspot information materials are put online so as to be provided for a user.

For example, when a Snowdon event occurs, hotspot information materials of an information security protection product may be generated for the first keyword "Snowdon", and these hotspot information materials enable a user to see products which are helpful in improving his/her own information security level at the same time as knowing about the Snowdon event. As another example, when Michael Jackson passed away, hotspot information materials of relevant CDs of Michael Jackson could be generated regarding the first keyword "Michael Jackson" for music CD retailers, and these hotspot information materials could enable a user to quickly purchase a CD of Michael Jackson at the same time as knowing about Michael Jackson.

The method for providing information of the embodiments of the present invention can generate hotspot information materials according to a current hotspot event, and organically combine the current hotspot event with information provision appeals of an information provider, so that the online hotspot information materials can precisely reflect the current hotspot event, and as a result, hotspot information materials fitting in with the current hotspot event can be provided when a user is searching. On the one hand, user needs can be met, and on the other hand, the information provision efficiency can be increased and the information conversion rate is improved.

Figure 2:
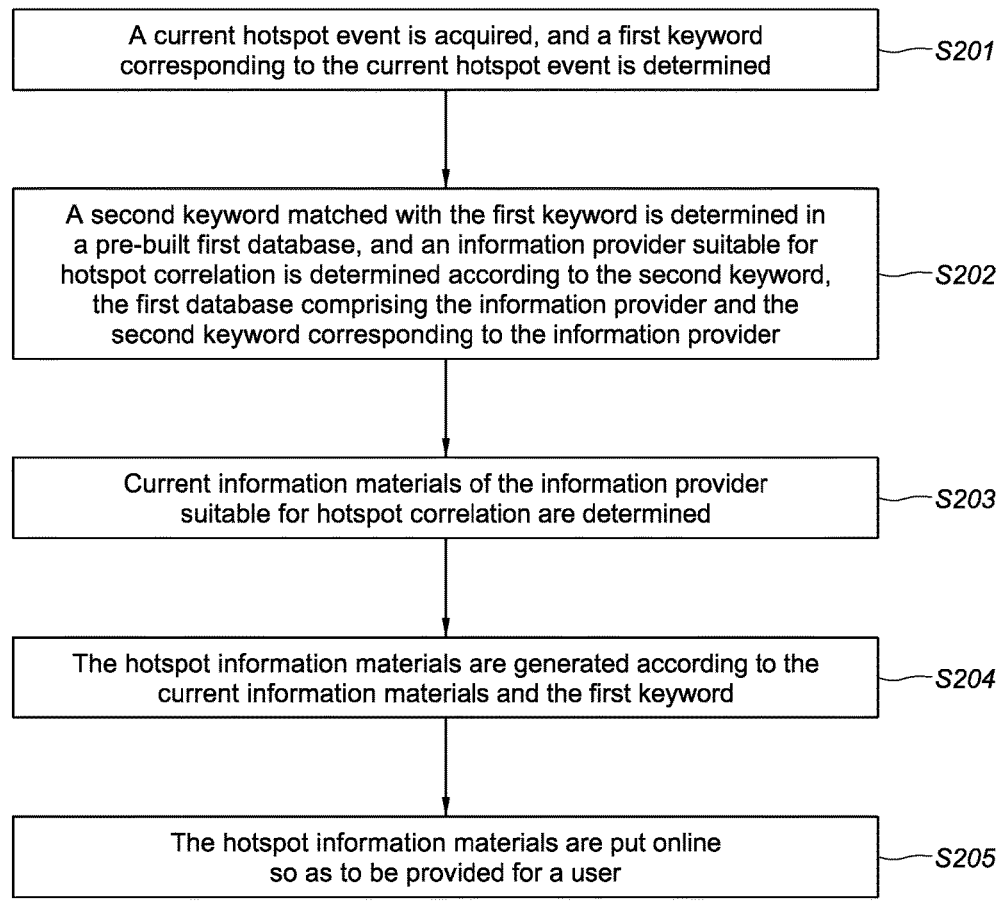
FIG. 2 is a flowchart of a method for providing information according to another embodiment of the present invention.

FIG. 2 is a flowchart of a method for providing information according to another embodiment of the present invention.

As shown in FIG. 2, the method for providing information comprises:

S201, a current hotspot event is acquired, and a first keyword corresponding to the current hotspot event is determined.

Specifically, first of all, a current hotspot event is acquired. In the embodiments of the present invention, the current hotspot event may be acquired by various means such as a search term input by a user in a search, popular microblogs, and news headlines, and the means for acquiring the current hotspot event is not limited in the embodiments of the present invention. Then, a first keyword corresponding to the current hotspot event is determined, the first keyword being able to accurately reflect the features of the current hotspot event. Word splitting may be performed on search terms, popular microblogs, news headlines, etc. so as to extract a word with a relatively high frequency as the first keyword. It may also be extracted manually and may likewise be acquired by other methods as well. The methods for acquiring the first keyword are not limited in the embodiments of the present invention.

S202, a second keyword matched with the first keyword is determined in a pre-built first database, and an information provider suitable for hotspot correlation is determined according to the second keyword, the first database comprising the information provider and the second keyword corresponding to the information provider.

The second keyword can accurately reflect the features of the information provided by the information provider, and the second keyword may be autonomously edited by the information provider, and may also be automatically extracted according to the information, and this is not limited in the embodiments of the present invention. Specifically, the first keyword is matched with the second keyword in the first database. If a second keyword which matches successfully exists in the first database, the information provider corresponding to the second keyword which matches successfully is acquired to serve as an information provider suitable for hotspot correlation.

S203, current information materials of the information provider suitable for hotspot correlation are determined.

Specifically, current information materials of the information provider suitable for hotspot correlation may be pre-stored in a database, and after the information provider suitable for hotspot correlation is determined, the current information materials are read from the corresponding database.

S204, the hotspot information materials are generated according to the current information materials and the first keyword.

For example, this process may generate the hotspot information materials depending on a machine learning method, or using a preset template for matching or filling, or using manual settings, etc., which is not limited in the embodiments of the present invention, and all methods which can generate the hotspot information materials according to the current information materials and the first keyword are applicable for the embodiments of the present invention.

S205, the hotspot information materials are put online so as to be provided for a user.

The method for providing information of the embodiments of the present invention can automatically generate the hotspot information materials according to the current information materials and the first keyword.

Figure 3:
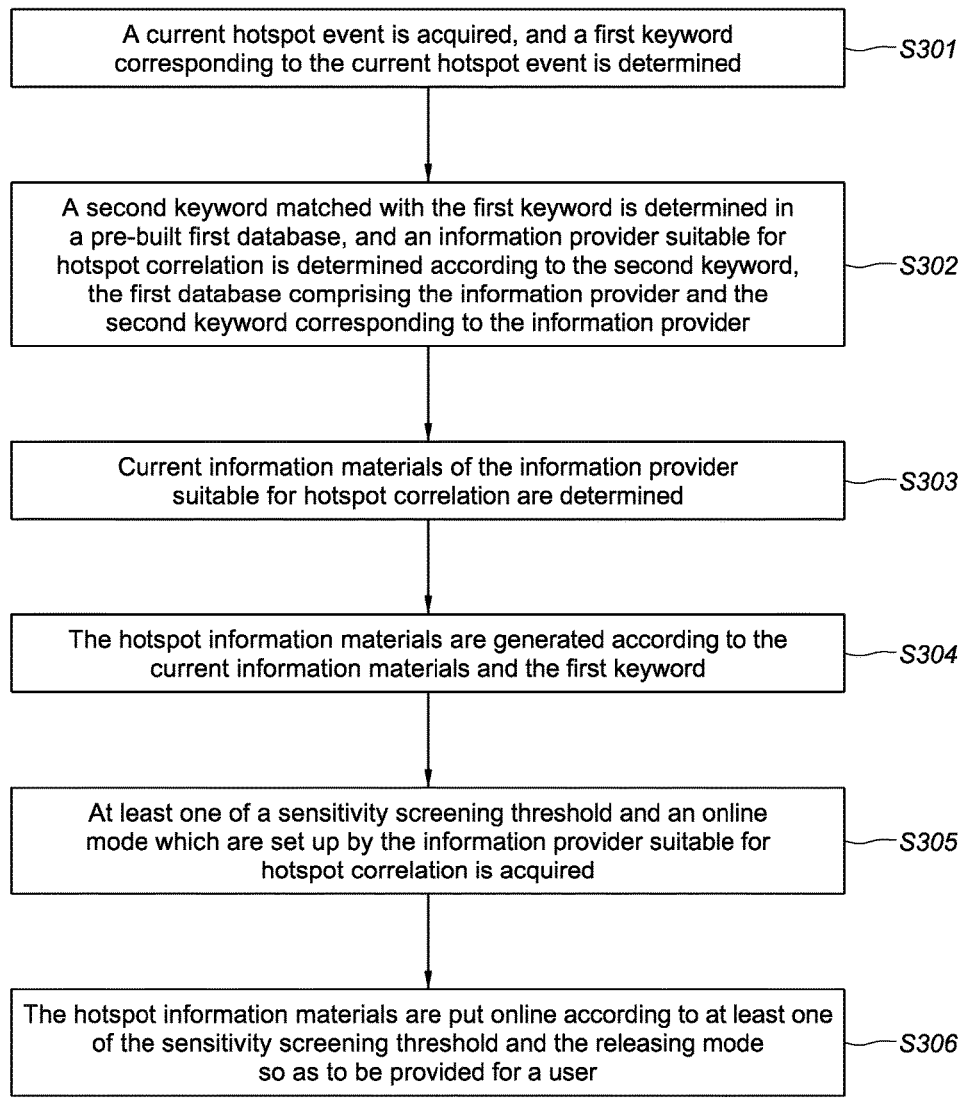
FIG. 3 is a flowchart of a method for providing information according to yet another embodiment of the present invention.

FIG. 3 is a flowchart of a method for providing information according to yet another embodiment of the present invention.

As shown in FIG. 3, the method for providing information comprises:

S301, a current hotspot event is acquired, and a first keyword corresponding to the current hotspot event is determined.

Specifically, first of all, a current hotspot event is acquired. In the embodiments of the present invention, the current hotspot event may be acquired by various means such as a search term input by a user in a search, popular microblogs, and news headlines, and the means for acquiring the current hotspot event is not limited in the embodiments of the present invention. Then, a first keyword corresponding to the current hotspot event is determined, the first keyword being able to accurately reflect the features of the current hotspot event. Word splitting may be performed on search terms, popular microblogs, news headlines, etc. so as to extract a word with a relatively high frequency as the first keyword. It may also be extracted manually and may likewise be acquired by other methods as well. The methods for acquiring the first keyword are not limited in the embodiments of the present invention.

S302, a second keyword matched with the first keyword is determined in a pre-built first database, and an information provider suitable for hotspot correlation is determined according to the second keyword, the first database comprising the information provider and the second keyword corresponding to the information provider.

The second keyword can accurately reflect the features of the information provided by the information provider, and the second keyword may be autonomously edited by the information provider, and may also be automatically extracted according to the information, and this is not limited in the embodiments of the present invention. Specifically, the first keyword is matched with the second keyword in the first database. If a second keyword which matches successfully exists in the first database, the information provider corresponding to the second keyword which matches successfully is acquired to serve as an information provider suitable for hotspot correlation.

S303, current information materials of the information provider suitable for hotspot correlation are determined.

Specifically, current information materials of the information provider suitable for hotspot correlation may be pre-stored in a database, and after the information provider suitable for hotspot correlation is determined, the current information materials are read from the corresponding database.

S304, the hotspot information materials are generated according to the current information materials and the first keyword.

For example, this process may generate the hotspot information materials depending on a machine learning method, or using a preset template for matching or filling, or using manual settings, etc., which is not limited in the embodiments of the present invention, and all methods which can generate the hotspot information materials according to the current information materials and the first keyword are applicable for the embodiments of the present invention.

S305, at least one of a sensitivity screening threshold and an online mode which are set up by the information provider suitable for hotspot correlation is acquired. It should be understood that the step may be carried out at any time, e.g., before S301, before S302. It is not limited to the embodiments of the present invention.

S306, the hotspot information materials are put online according to at least one of the sensitivity screening threshold and the online mode so as to be provided for a user.

The process of making the hotspot information materials online according to at least one of the sensitivity screening threshold and the releasing mode is specifically described below.

In one embodiment of the present invention, making the hotspot information materials online according to the sensitivity screening threshold comprises: determining the sensitivity of the current hotspot event, and making the hotspot information materials of the current hotspot event of which the sensitivity is in the range of the sensitivity screening threshold online. Specifically, the sensitivity reflects the degree of attention of the current hotspot event, and a sensitivity threshold may be set up, such as high, medium and low, wherein the higher the sensitivity, the earlier the current hotspot event can be captured, wherein the sensitivity can be set up according to specific releasing needs of the information provider.

In one embodiment of the present invention, the online mode comprises automatic online or automatic delay online, making the hotspot information materials online according to the releasing mode, comprising: (1) when the online mode is automatic online and when the sensitivity reaches a first preset condition, making the corresponding hotspot information materials online, the first preset condition comprising reaching a first preset sensitivity; or (2) when the online mode is delay online and when the sensitivity reaches a second preset condition, making the corresponding hotspot information materials online, the second preset condition comprising reaching the first preset sensitivity and a preset time lasting under the first preset sensitivity.

In one embodiment of the present invention, it further comprises: acquiring an offline mode which is set up by the information provider suitable for hotspot correlation, the offline mode comprising automatic offline or automatic delay offline or manual offline, and the method further comprises: (1) when the offline mode is automatic offline and when the sensitivity reaches a third preset condition, making the corresponding hotspot information materials offline, the third preset condition comprising being lower than a second preset sensitivity; or (2) when the offline mode is the delay offline and when the sensitivity reaches a fourth preset condition, making the corresponding hotspot information materials offline, the fourth preset condition comprising being lower than the second preset sensitivity and a preset time lasting under the second preset sensitivity; or (3) when the offline mode is manual offline, making the corresponding hotspot information materials offline according to an offline instruction of the information provider suitable for hotspot correlation.

The method for providing information of the embodiments of the present invention makes the hotspot information materials online according to at least one of the sensitivity screening threshold and the releasing mode, and offline according to the offline mode, and can automatically make information online according to the settings of the information provider, thereby improving efficiency.

The embodiments of the present invention also propose a method for providing a search result.

Figure 4:
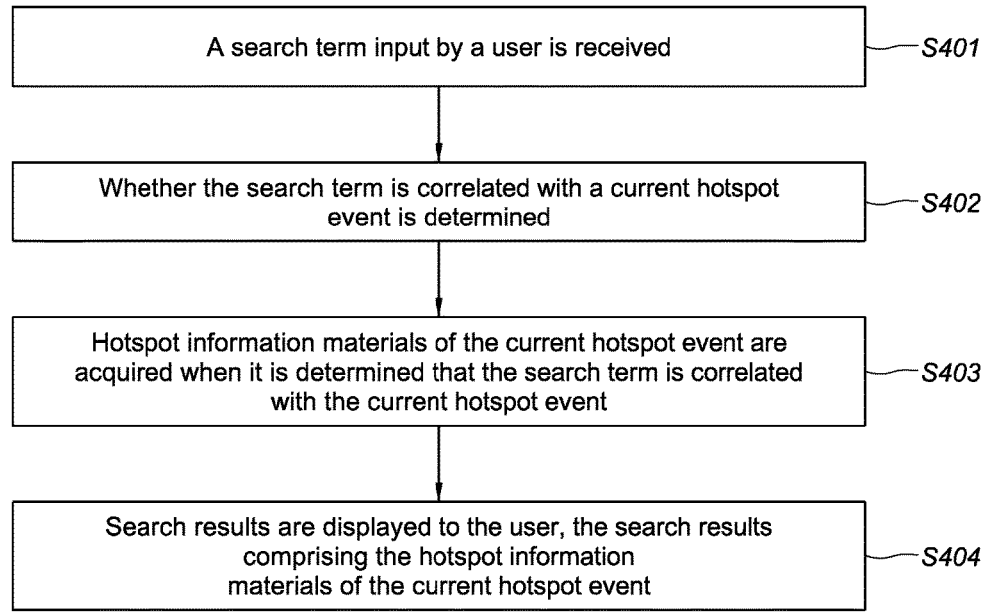
FIG. 4 is a flow chart of a method for providing a search result according to one embodiment of the present invention.

FIG. 4 is a flowchart of a method for providing a search result according to one embodiment of the present invention.

As shown in FIG. 4, the method for providing a search result comprises:

S401, a search term input by a user is received.

Specifically, in the embodiments of the present invention, a user can input the current search term in an input box provided by a search engine, and the user can also input search terms in various quick search input boxes, and this is not defined in the embodiments of the method.

S402, whether the search term is correlated with a current hotspot event is determined.

Specifically, the search term may be matched with a first keyword of a current hotspot event (see the first keyword described in any one of the above-mentioned embodiments for detail), and if it is matched, it is determined that the search term is correlated with the current hotspot event.

S403, hotspot information materials of the current hotspot event are acquired when it is determined that the search term is correlated with the current hotspot event, the hotspot information materials being provided by the method for providing information according to any one of the above-mentioned embodiments. Reference can be made to the above-mentioned embodiments for details, which will not be described here again redundantly.

S404, search results are displayed to the user, the search results comprising the hotspot information materials of the current hotspot event.

In the method for providing a search result of the embodiments of the present invention, when a user performs a search, if a search term input by the user is correlated with a current hotspot event, search results may be provided for and displayed to the user, the search results comprising hotspot information materials of the current hotspot event, such that, on the one hand, user needs can be met, and on the other hand, the information provision efficiency can be increased and the information conversion rate improved.

In order to implement the above-mentioned embodiments, the embodiments of the present invention also propose an apparatus for providing information.

Figure 5:
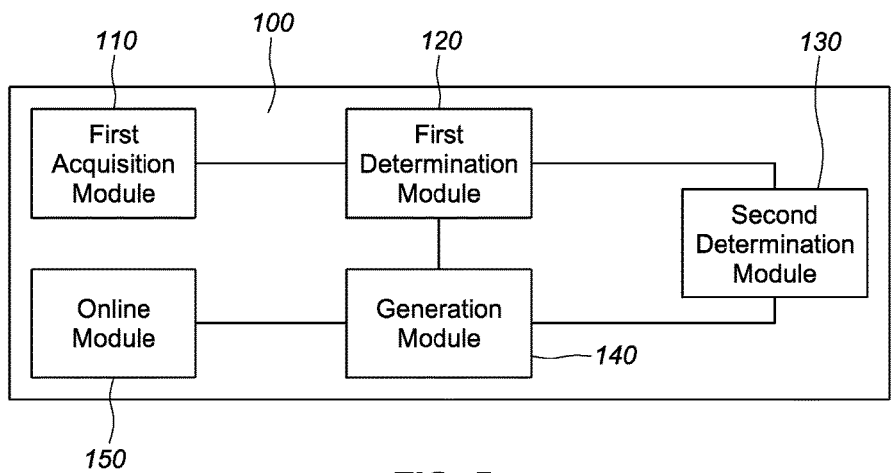
FIG. 5 is a structural block diagram of an apparatus for providing information according to one embodiment of the present invention.

FIG. 5 is a structural block diagram of an apparatus for providing information according to one embodiment of the present invention.

As shown in FIG. 5, the apparatus for providing information 100 comprises a first acquisition module 110, a first determination module 120, a second determination module 130, a generation module 140 and an online module 150.

Specifically, the first acquisition module 110 is used for acquiring a current hotspot event. The first determination module 120 is used for determining a first keyword corresponding to the current hotspot event. More specifically, first of all, the first acquisition module 110 acquires a current hotspot event. In the embodiments of the present invention, the current hotspot event may be acquired by various means such as a search term input by a user in a search, popular microblogs, and news headlines, and the means for acquiring the current hotspot event is not limited in the embodiments of the present invention. Then, the first determination module 120 determines a first keyword corresponding to the current hotspot event, the first keyword being able to accurately reflect the features of the current hotspot event. Word splitting may be performed on search terms, popular microblogs, news headlines, etc. so as to extract a word with a relatively high frequency as the first keyword. It may also be extracted manually and may likewise be acquired by other methods as well. The methods for acquiring the first keyword are not limited in the embodiments of the present invention.

The second determination module 130 is used for determining a second keyword matched with the first keyword in a pre-built first database, and determining an information provider suitable for hotspot correlation according to the second keyword, the first database comprising the information provider and the second keyword corresponding to the information provider. The second keyword can accurately reflect the features of the information released by the information provider, and the second keyword may be autonomously edited by the information provider, and may also be automatically extracted according to the information, and this is not limited in the embodiments of the present invention. More specifically, the second determination module 130 matches the first keyword with the second keyword in the first database, and if a second keyword which matches successfully exists in the first database, acquires the information provider corresponding to the second keyword which matches successfully to serve as an information provider suitable for hotspot correlation.

The generation module 140 is used for generating hotspot information materials of the information provider suitable for hotspot correlation according to the first keyword. The online module 150 is used for making the hotspot information materials online so as to be provided for a user.

For example, when a Snowdon event occurs, hotspot information materials of an information security protection product may be generated for the first keyword "Snowdon", and these hotspot information materials enable a user to see products which are helpful in improving his/her own information security level at the same time as knowing about the Snowdon event. As another example, when Michael Jackson passed away, hotspot information materials of relevant CDs of Michael Jackson could be generated regarding the first key word "Michael Jackson" for music CD retailers, and these hotspot information materials could enable a user to quickly purchase a CD of Michael Jackson at the same time as knowing about Michael Jackson.

The apparatus for providing information of the embodiments of the present invention can generate hotspot information materials according to a current hotspot event, and organically combine the current hotspot event with information provision appeals of an information provider, so that the online hotspot information materials can precisely reflect the current hotspot event, and as a result, hotspot information materials fitting in with the current hotspot event can be provided when a user is searching. On the one hand, user needs can be met, and on the other hand, the information providing efficiency can be increased and the information conversion rate is improved.

Figure 6:
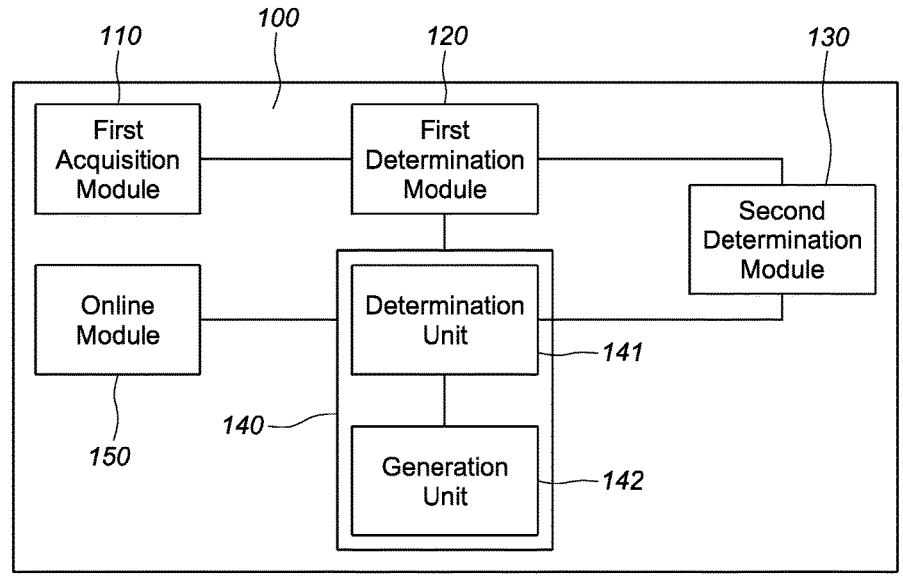
FIG. 6 is a structural block diagram of an apparatus for providing information according to another embodiment of the present invention.

FIG. 6 is a structural block diagram of an apparatus providing information according to another embodiment of the present invention.

As shown in FIG. 6, the apparatus providing information 100 comprises a first acquisition module 110, a first determination module 120, a second determination module 130, a generation module 140 and an online module 150, wherein the generation module 140 comprises a determination unit 141 and a generation unit 142.

Specifically, the determination unit 141 is used for determining current information materials of the information provider suitable for hotspot correlation. More specifically, current information materials of the information provider suitable for hotspot correlation may be pre-stored in a database, and after the information provider suitable for hotspot correlation is determined, the current information materials are read from the corresponding database.

The generation unit 142 is used for generating the hotspot information materials according to the current information materials and the first keyword. For example, this process may generate the hotspot information materials depending on a machine learning method, or using a preset template for matching or filling, or using manual settings, etc., which is not limited in the embodiments of the present invention, and all methods which can generate the hotspot information materials according to the current information materials and the first keyword are applicable for the embodiments of the present invention.

The apparatus for providing information of the embodiments of the present invention can automatically generate the hotspot information materials according to the current information materials and the first keyword.

Figure 7:
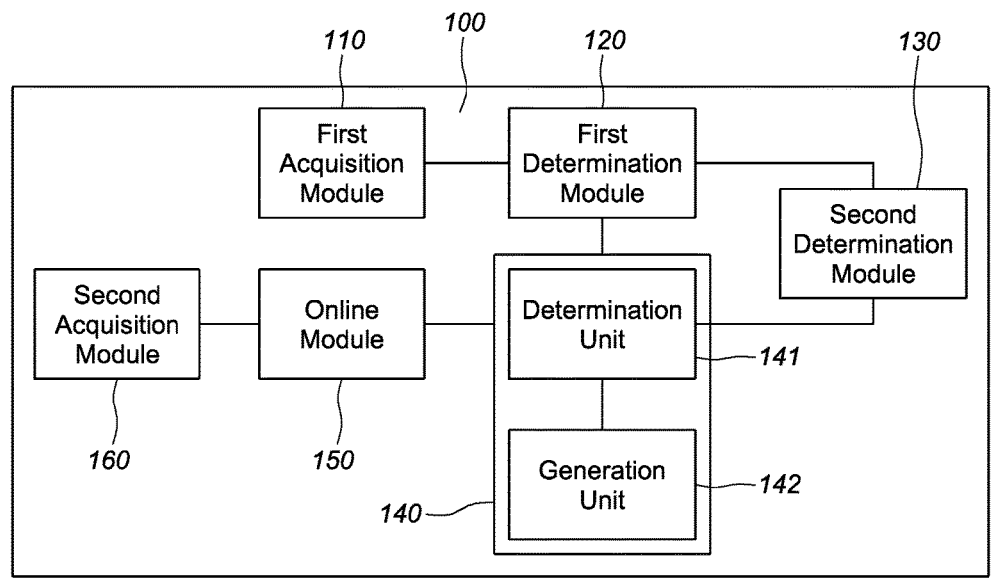
FIG. 7 is a structural block diagram of an apparatus for providing information according to yet another embodiment of the present invention.

FIG. 7 is a structural block diagram of an apparatus for providing information according to yet another embodiment of the present invention.

As shown in FIG. 7, the apparatus for providing information 100 comprises a first acquisition module 110, a first determination module 120, a second determination module 130, a generation module 140, an online module 150 and a second acquisition module 160, wherein the generation module 140 comprises a determination unit 141 and a generation unit 142.

Specifically, the second acquisition module 160 is used for acquiring at least one of a sensitivity screening threshold and an online mode which are set up by the information provider suitable for hotspot correlation before the hotspot information materials are put online, wherein the online module 150 is specifically used for making the hotspot information materials online according to at least one of the sensitivity screening threshold and the online mode.

The process of making the hotspot information materials online according to at least one of the sensitivity screening threshold, the releasing mode and the offline mode is specifically described below.

In one embodiment of the present invention, the online module 150 is specifically used for determining the sensitivity of the current hotspot event, and making the hotspot information materials of the current hotspot event of which the sensitivity is in the range of the sensitivity screening threshold online. Specifically, the sensitivity reflects the degree of attention of the current hotspot event, and a sensitivity threshold may be set up, such as high, medium and low, wherein the higher the sensitivity, the earlier the current hotspot event can be captured, wherein the sensitivity can be set up according to specific releasing needs of the information provider.

In one embodiment of the present invention, the online mode comprises automatic online or automatic delay online, and the online module 150 is specifically used for: (1) when the online mode is automatic online and when the sensitivity reaches a first preset condition, making the corresponding hotspot information materials online, the first preset condition comprising reaching a first preset sensitivity; or (2) when the online mode is delay online and when the sensitivity reaches a second preset condition, making the corresponding hotspot information materials online, the second preset condition comprising reaching the first preset sensitivity and a preset time lasting under the first preset sensitivity.

In one embodiment of the present invention, the second acquisition module 160 is further used for acquiring an offline mode which is set up by the information provider suitable for hotspot correlation, the offline mode comprising automatic offline or automatic delay offline or manual offline, and the apparatus further comprises an offline module (not shown in the figure), the offline module being specifically used for: (1) when the offline mode is automatic offline and when the sensitivity reaches a third preset condition, making the corresponding hotspot information materials offline, the third preset condition comprising being lower than a second preset sensitivity; or (2) when the offline mode is delay offline and when the sensitivity reaches a fourth preset condition, making the corresponding hotspot information materials offline, the fourth preset condition comprising being lower than the second preset sensitivity and a preset time lasting under the second preset sensitivity; or (3) when the offline mode is manual offline, making the corresponding hotspot information materials offline according to an offline instruction of the information provider suitable for hotspot correlation.

The apparatus for providing information of the embodiments of the present invention makes the hotspot information materials online according to at least one of the sensitivity screening threshold and the releasing mode, and to be offline according to the offline mode, and can automatically release information according to the settings of the information provider, thereby improving efficiency.

In order to implement the embodiments above, the embodiments of the present invention also propose an apparatus for providing a search result.

Figure 8:
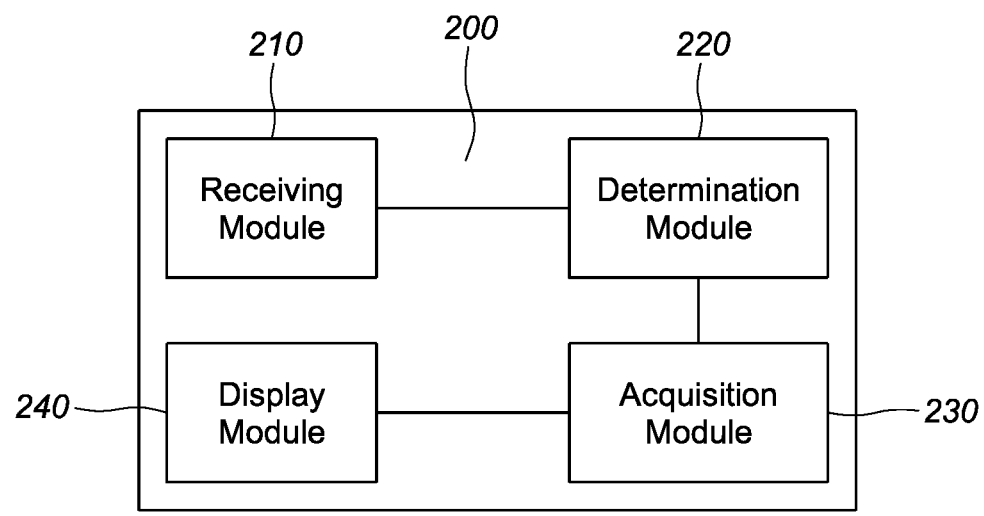
FIG. 8 is a structural block of an apparatus for providing a search result according to one embodiment of the present invention.

FIG. 8 is a structural block of an apparatus for providing a search result according to one embodiment of the present invention.

As shown in FIG. 8, the an apparatus for providing a search result 200 comprises a receiving module 210, a determination module 220, an acquisition module 230 and a display module 240.

Specifically, the receiving module 210 is used for receiving a search term input by a user. More specifically, in the embodiments of the present invention, a user may input a current search term in an input box provided by a search engine, and the user may also input search terms in various shortcut search input boxes, and this is not defined in the embodiments of the method.

The determination module 220 is used for determining whether the search term is correlated to a current hotspot event. More specifically, the determination module 220 may match the search term with a first keyword of a current hotspot event (see the first keyword described in any one of the above-mentioned embodiments for detail), and if it is matched, determine that the search term is correlated with the current hotspot event.

The acquisition module 230 is used for acquiring hotspot information materials of the current hotspot event when it is determined that the search term is correlated with the current hotspot event, the hotspot information materials being provided by the method for providing information according to any one of the above-mentioned embodiments. Reference can be made to the above-mentioned embodiments for details, which will not be described here again redundantly.

The display module 240 is used for displaying search results to the user, the search results comprising the hotspot information materials of the current hotspot event.

With the apparatus for providing a search result of the embodiments of the present invention, when a user performs a search, if a search term input by the user is correlated with a current hotspot event, search results may be provided for and displayed to the user, the search results comprising hotspot information materials of the current hotspot event such that, on the one hand, user needs can be met, and on the other hand, the information provision efficiency can be increased and the information conversion rate improved.

It should be understood that various parts of the present invention may be implemented by means of hardware, software, firmware or a combination thereof. In the embodiments above, multiple steps or methods may be implemented by means of software or firmware stored in a memory and executed by an appropriate instruction execution system. For example, if implemented by means of hardware, likewise in another embodiment, it can be implemented by means of any one or a combination of the following techniques commonly known in the art: a discrete logical circuit having a logical gate circuit used for implementing a logical function for a data signal, an application-specific integrated circuit having an appropriate combinational logical gate circuit, a programmable gate array (PGA), and a field programmable gate array (FPGA), etc.

In the explanation of the description, the explanation of reference terms such as "one embodiment", "some embodiments", "an example", "a specific example" or "some examples" is intended to mean that a particular feature, structure, material or characteristic described in connection with the embodiment or example is included in at least one embodiment or example of the present invention. In the present description, the illustrative expression of the above-mentioned terms does not necessarily refer to the same embodiment or example. Furthermore, the described particular feature, structure, material or characteristic may be combined in a suitable manner in any one or multiple embodiments or examples.

Although the embodiments of the present invention have been shown and described, those of ordinary skill in the art shall understand that various changes, modifications, replacements and variations can be made to and on these embodiments without departing from the principle and spirit of the present invention, and the scope of the present invention is defined by the claims and equivalents thereof.

What is claimed is:

1. A method for providing information about a current hotspot event, the method being implemented by a server computer of a search engine in communication with a client computer, comprising:
   determining a first keyword that reflects one or more features of the current hotspot event;
   receiving, from the client computer, a search term inputted in an input box on a user interface of the search engine displayed on the client computer;
   determining that the search term is correlated with the first keyword;
   determining a second keyword matched with the first keyword in a first database, the second keyword reflecting one or more features of an advertisement, the second and the first keywords being matched by including a same person name, a same geographic location, a same product functionality, or a combination thereof;
   determining current information materials of the advertisement;
   generating hotspot information materials according to the current information materials and the first keyword;
   acquiring at least one of a sensitivity screening threshold and an online mode;
   making the hotspot information materials available online according to the at least one of the sensitivity screening threshold and the online mode; and
   sending the hotspot information materials to the client computer,
   wherein the client computer displays search results associated with the search term on the user interface, and
   wherein the search results include the hotspot information materials.

2. The method of claim 1, further comprising acquiring the current hotspot event.

3. The method of claim 1, wherein said acquiring occurs before said making the hotspot information materials available online.

4. The method of claim 1, wherein said making the hotspot information materials available online comprises:
   determining whether a sensitivity of the current hotspot event satisfies the sensitivity screening threshold; and
   making the hotspot information materials available online based upon said determining whether the sensitivity of the current hotspot event satisfies the sensitivity screening threshold.

5. The method of claim 4,
   wherein the online mode comprises at least one of automatic online and delay online, and
   wherein said making the hotspot information materials available online according to the online mode comprises at least one of:
   making the corresponding hotspot information materials online based upon a first determination that the online mode is the automatic online and a second determination that the sensitivity has reached a first preset sensitivity; and
   making the corresponding hotspot information materials online based upon a third determination that the online mode is the delay online and a fourth determination that the sensitivity has reached a second preset condition that comprises reaching the first preset sensitivity and a preset time lasting under the first preset sensitivity.

6. The method of claim 5, further comprising:
   acquiring an offline mode comprising at least one of automatic offline, delay offline and manual offline; and
   at least one of:
   making the corresponding hotspot information materials offline based upon a fifth determination that the offline mode is the automatic offline and a sixth determination that the sensitivity has reached a third preset condition that is lower than a second preset sensitivity;
   making the corresponding hotspot information materials offline based upon a seventh determination that the offline mode is the delay offline and an eighth determination that the sensitivity has reached a fourth preset condition being lower than the second preset sensitivity and a preset time lasting under the second preset sensitivity; and
   making the corresponding hotspot information materials offline according to an offline instruction based upon a ninth determination that the offline mode is the manual offline.

7. The method of claim 6, further comprising making the corresponding hotspot information materials offline based upon the seventh determination and the eighth determination.

8. The method of claim 6, further comprising making the corresponding hotspot information materials offline according to the offline instruction based upon the ninth determination.

9. The method of claim 5, further comprising making the corresponding hotspot information materials available online based upon the third determination and the fourth determination.

10. An apparatus for providing information to a client computer, comprising:
a hardware processor; and
a memory having one or more programs stored thereon for instructing said hardware processor to:
acquire a current hotspot event;
determine a first keyword that reflects one or more features of the current hotspot event;
receive, from the client computer, a search term inputted in an input box on a user interface of a search engine displayed on the client computer;
determine that the search term is correlated with the first keyword;
determine a second keyword matched with the first keyword in a first database, the second keyword reflecting one or more features of an advertisement, the second and the first keywords being matched by including a same person name, a same geographic location, a same product functionality, or a combination thereof;
determine current information materials of the advertisement;
generate hotspot information materials according to the current information materials and the first keyword;
acquire at least one of a sensitivity screening threshold and an online mode;
make the hotspot information materials available online according to the at least one of the sensitivity screening threshold and the online mode; and
send the hotspot information materials to the client computer,
wherein the client computer displays search results associated with the search term on the user interface, and
wherein the search results include the hotspot information materials.

11. The apparatus of claim 10, wherein said hardware processor acquires the at least one of the sensitivity screening threshold and the online mode before the hotspot information materials are put online.

12. The apparatus of claim 10, wherein said hardware processor is configured for determining a sensitivity of the current hotspot event and making the hotspot information materials online based upon whether the sensitivity of the current hotspot event satisfies the sensitivity screening threshold.

13. The apparatus of claim 12,
wherein the online mode comprises at least one of automatic online and delay online; and said hardware processor is configured for at least one of:
making the corresponding hotspot information materials online based upon a first determination that the online mode is the automatic online and a second determination that the sensitivity has reached a first preset sensitivity; and
making the corresponding hotspot information materials online based upon a third determination that the online mode is the delay online and a fourth determination that the sensitivity has reached a second preset condition that comprises reaching the first preset sensitivity and a preset time lasting under the first preset sensitivity.

14. The apparatus of claim 13, wherein said hardware processor is configured for making the corresponding hotspot information materials available online based upon the third determination and the fourth determination.

15. The apparatus of claim 12, wherein said hardware processor is configured for acquiring an offline mode, the offline mode comprising at least one of automatic offline, delay offline and manual offline; and
wherein said hardware processor is configured for at least one of:
making the corresponding hotspot information materials offline based upon a fifth determination that the offline mode is the automatic offline and a sixth determination that the sensitivity has reached a third preset condition that is lower than a second preset sensitivity;
making the corresponding hotspot information materials offline based upon a seventh determination that the offline mode is the delay offline and an eighth determination that the sensitivity has reached a fourth preset condition being lower than the second preset sensitivity and a preset time lasting under the second preset sensitivity; and
making the corresponding hotspot information materials offline according to an offline instruction based upon a ninth determination that the offline mode is the manual offline.

16. The apparatus of claim 15, wherein said hardware processor is configured for making the corresponding hotspot information materials offline based upon the seventh determination and the eighth determination.

17. The apparatus of claim 15, wherein said hardware processor is configured for making the corresponding hotspot information materials offline according to the offline instruction based upon the ninth determination.

18. A non-transitory computer storage medium including at least one program for providing information about a current hotspot event when implemented by a hardware processor associated with a server computer of a search engine in communication with a client computer, said at least one program instructing the hardware processor to:
determine a first keyword that reflects one or more features of the current hotspot event;
receive, from the client computer, a search term inputted in an input box on a user interface of the search engine displayed on the client computer;
determine that the search term is correlated with the first keyword;
determine a second keyword matched with the first keyword in a first database, the second keyword reflecting one or more features of an advertisement, the second and the first keywords being matched by including a same person name, a same geographic location, a same product functionality, or a combination thereof;
determine current information materials of the advertisement according to the second keyword;
generate hotspot information materials according to the current information materials and the first keyword;
acquire at least one of a sensitivity screening threshold and an online mode;
make the hotspot information materials available online according to the at least one of the sensitivity screening threshold and the online mode; and
send the hotspot information materials to the client computer,
wherein the client computer displays search results associated with the search term on the user interface, and
wherein the search results include the hotspot information materials.

19. The computer storage medium of claim 18, wherein said at least one program instructs the hardware processor to acquire the current hotspot event.

20. The computer storage medium of claim 18, wherein said at least one program instructs the hardware processor to:
  determine whether a sensitivity of the current hotspot event satisfies the sensitivity screening threshold; and
  make the hotspot information materials available online based upon determining whether the sensitivity of the current hotspot event satisfies the sensitivity screening threshold.

\* \* \* \* \*